(No Model.) 3 Sheets—Sheet 1.
W. H. NEWTON.
COMBINED HARROW AND ROLLER.
No. 594,892. Patented Dec. 7, 1897.
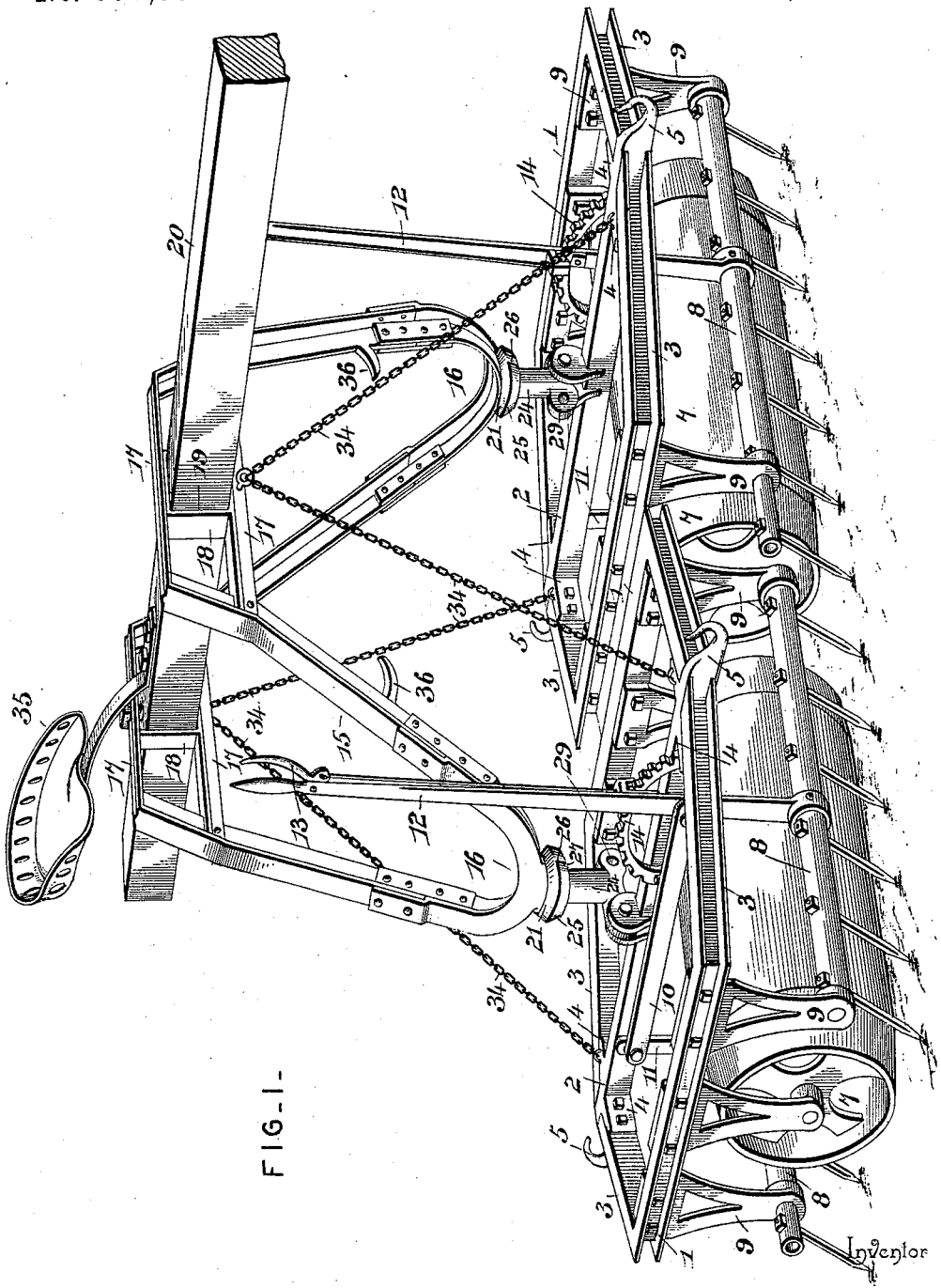
FIG-1-
Witnesses
Jas. H. McCathran
V. B. Hillyard.
By his Attorneys, William H. Newton
C. A. Snow & Co.

(No Model.) 3 Sheets—Sheet 2.
W. H. NEWTON.
COMBINED HARROW AND ROLLER.
No. 594,892. Patented Dec. 7, 1897.
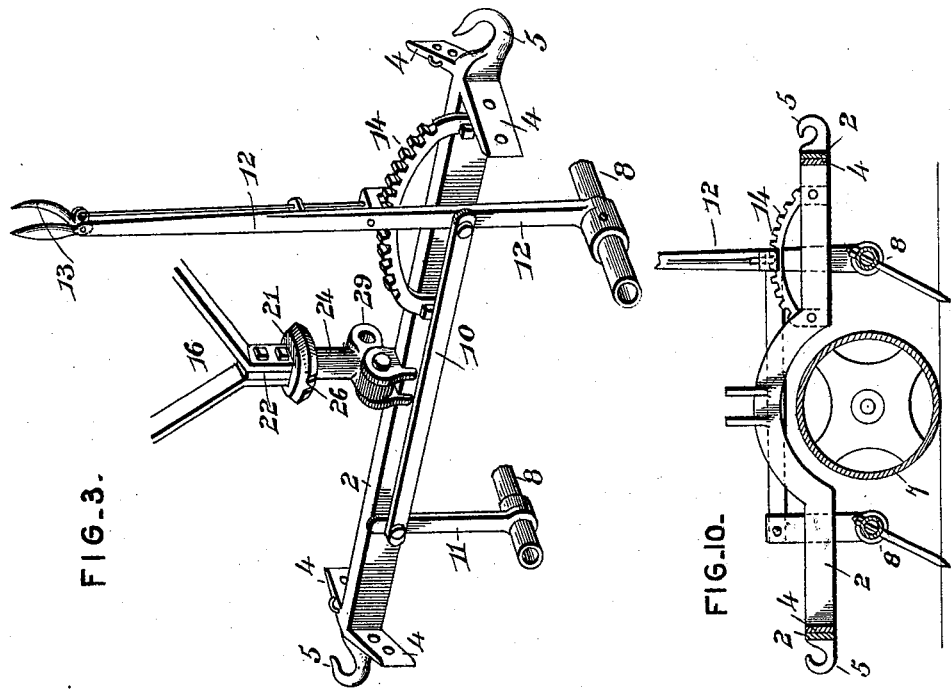
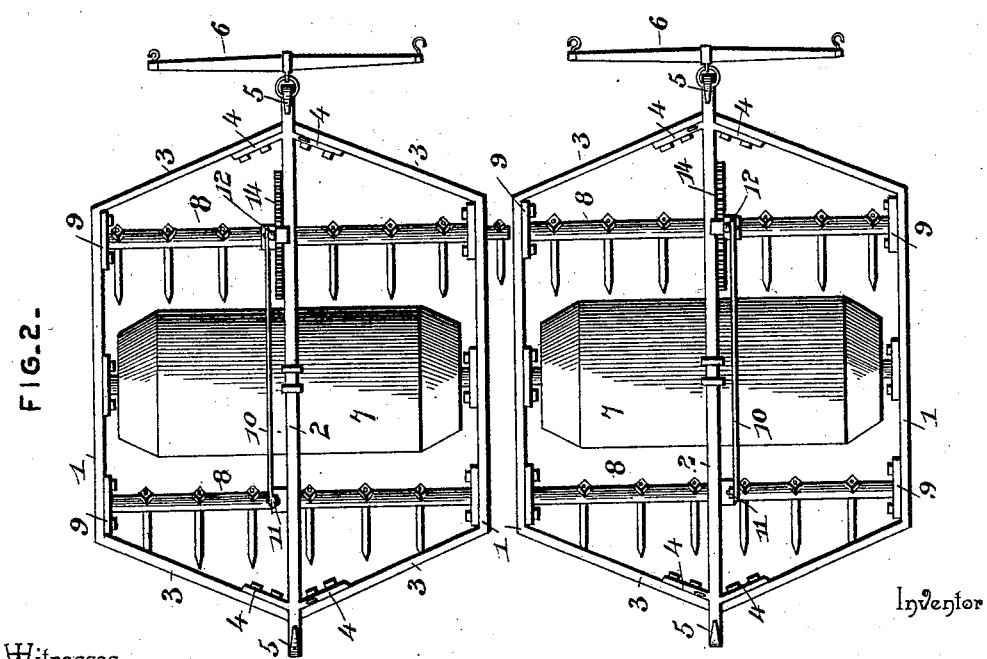
Witnesses
Jas. K. McCathran
V. B. Hillyard
Inventor
William H. Newton
By his Attorneys,
C. A. Snow & Co.

(No Model.) 3 Sheets—Sheet 3.
W. H. NEWTON.
COMBINED HARROW AND ROLLER.
No. 594,892. Patented Dec. 7, 1897.
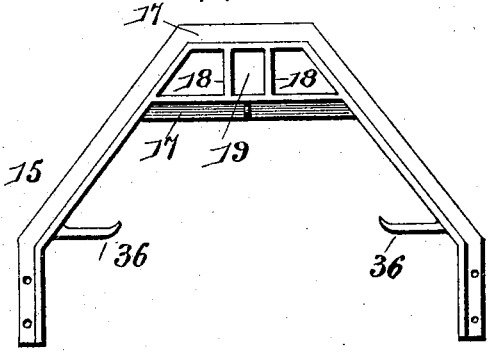
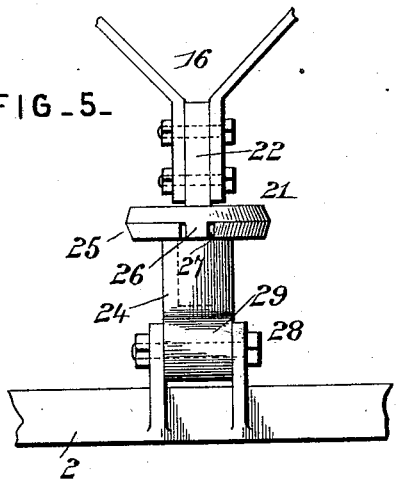
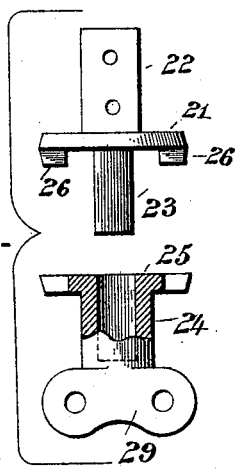
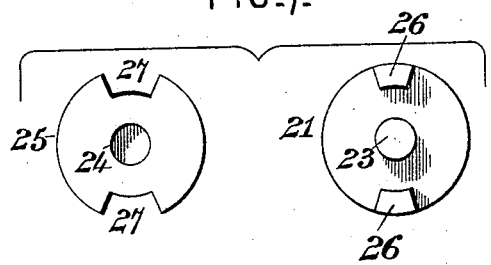
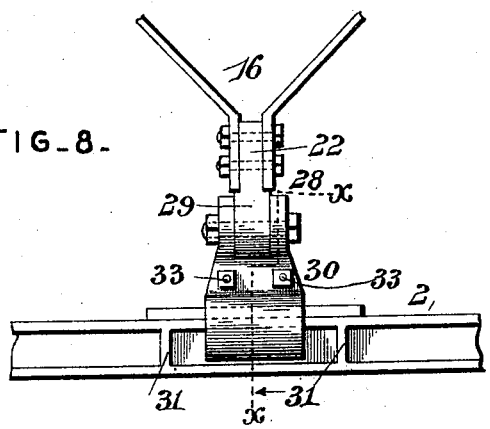
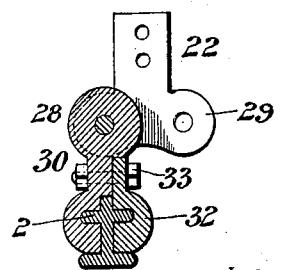
Witnesses
Jas. K. McCathran
V. B. Hillyard
Inventor
William H. Newton
By his Attorneys,
C. A. Snow & Co.

UNITED STATES PATENT OFFICE.

WILLIAM HENRY NEWTON, OF DECATUR, ILLINOIS.

COMBINED HARROW AND ROLLER.

SPECIFICATION forming part of Letters Patent No. 594,892, dated December 7, 1897.

Application filed October 25, 1895. Serial No. 566,854. (No model.)

*To all whom it may concern:*

Be it known that I, WILLIAM HENRY NEWTON, a citizen of the United States, residing at Decatur, in the county of Macon and State of Illinois, have invented a new and useful Combined Harrow and Roller, of which the following is a specification.

This invention relates to agricultural implements for cultivating and preparing the soil for planting, and aims to provide a machine which can be used either for harrowing or cultivating or for rolling the land or for performing both operations simultaneously.

The primary object of the invention is to secure an extended implement which will comprise sections, the latter being so arranged as to conform to the surface of the ground and act upon the latter uniformly throughout the extent or breadth of the machine.

For a full understanding of the invention reference is to be had to the accompanying drawings and the subjoined description, and the invention for attaining the desired end resides in the details, novel features, and combinations of the parts, which hereinafter will be more particularly specified, illustrated, and claimed.

Referring to the drawings, which illustrate an embodiment of the invention, although slight changes in the details, proportion, and arrangement of the parts may be resorted to without departing from the nature of the invention—

Figure 1 is a perspective view of the improved implement. Fig. 2 is a top plan view, the arched frame and pole being removed. Fig. 3 is a detail view of the middle longitudinal frame-bar, showing the provisions for adjusting the harrow-bars and the pivot connection between the said bar and the arched frame. Fig. 4 is a front view of the arched frame. Fig. 5 is a detail view of the pivot connection between the arched frame and the harrow. Fig. 6 is a detail view of the pivot connection, showing the parts separated. Fig. 7 is a detail view of the opposing ends of the parts shown in Fig. 6. Fig. 8 is a detail view showing the arched frame having a sliding connection with the harrow-frame. Fig. 9 is a section on the line X X of Fig. 8, looking in the direction of the arrow. Fig. 10 shows a modification in which the frame-bars are arched over the roller.

The same reference-numerals indicate corresponding and like parts in all the figures of the drawings.

The implement comprises two sections of similar construction and size, each having its frame composed of side bars 1, a middle longitudinal bar 2, and end V-bars 3, which are oppositely disposed with their angles extending outwardly and secured to oblique flanges 4, formed or otherwise provided at the ends of the middle bar 2 and having their outer ends secured or formed with the side bars 1. The several frame-bars will be of metal and may have any desired shape in cross-section, but for the sake of lightness and durability they are flanged at their upper and lower edges.

To provide a substantial frame and avoid unnecessary joints, the side bars 1 will be of a sufficient length and have their end portions bent, so as to provide one-half of the V-bars 3, the extremities of which are bolted or otherwise secured to the oblique flanges 4, which are integrally formed with the middle bar 2. Draft-hooks 5 are provided at the ends of the middle bar 2 and have the singletrees 6 connected therewith. A series of hangers, three for each side bar, are attached to the latter at the ends and at an intermediate point, the hangers on one side bar corresponding in position with the hangers on the companion side bar. A crushing-roller 7 is journaled at its ends to the middle hangers, and toothed bars 8 are mounted at their ends in the end hangers, and these hangers 9 are of equal length and spaced a like distance apart to present a uniform appearance and distribute the weight and strain evenly throughout the frame. It will be seen that if it is only required to roll the land the toothed bars may be omitted, or if the land is to be harrowed and not rolled the roller can be replaced by a toothed bar, but generally it is desirable to both harrow and roll the land simultaneously. Hence the crushing-roller and the toothed bars will be employed to act jointly.

It is desirable to change the pitch and inclination of the teeth, and this is accomplished in the present instance by turning the toothed bars in their bearings, and in order to operate both together they are connected by means of a bar 10, which is secured at its rear end to an arm 11, extending vertically from the rear toothed bar and at its front end to a lever 12, which is made fast at its lower end to the front toothed bar, and this lever 12 is supplied with the usual hand-latch 13, which acts jointly with a toothed or notched segment 14, so as to hold the toothed bars in their adjusted position. The segment 14 is attached to the front portion of the middle longitudinal bar 2, and the parts 10, 11, and 12 are centrally disposed to admit of the hand-latch readily engaging with the teeth of the said segment 14.

The arched frame 15 for connecting the two sections and holding them at a fixed distance apart is composed of approximately U-shaped side pieces 16, which are oppositely inclined, and parallel cross-bars 17, connecting the upper ends of their members, and these cross-bars are connected intermediate of their ends by uprights 18, which form a socket 19, which receives the pole or tongue 20, the latter being retained in the sockets 19 in any desired manner. The lower ends of the arched frame are coupled with the sections in such a manner as to admit of the sections moving independently and rocking, so as to adapt themselves to the roll and surface of the ground, and to move horizontally about a vertical axle, so as to obviate any torsional strain incident to the strain or load being greater upon one side of the section than the other. A circular plate 21 is formed with a shank 22, which is firmly secured between the lower ends of the members of each side piece 16, and with a pendent spindle 23, which obtains a bearing in a vertical socket 24, which socket is connected by means of a knuckle-joint with the middle frame-bar 2. The socket 24 is formed at its upper end with a plate 25, corresponding to the plate 21, and the latter has depending lugs 26 at diametrically opposite points to enter and operate in segmental notches 27, provided in the plate 25, and these notches are of a slightly greater length than the lugs 26 to admit of a limited play or movement of the plate 21 upon the plate 25. By this means it will be seen that the sections comprising the implement are adapted to have a limited play or movement about a vertical axis. The knuckle-joint 28, between the socket 24 and the frame-bar 2, admits of the section tilting to adapt itself to the roll and nature of the ground, so that the harrow-teeth and the crushing-roller will operate evenly upon the extent of the soil traversed thereby. The socket 24 will be formed at its lower end with two eyes or sleeves 29, either one of which forms a complementary part of the knuckle-joint and which makes provision for bringing the sections closer together or moving them farther apart, as required. In some instances the knuckle-joints will be slidably connected with the frame-bars 2 of the sections, and to secure this result a coupling 30 will be provided and mounted upon the bar 2, so as to move thereon, stops 31 being provided on the sides of the said bar, so as to limit the movements of the coupling, and this coupling will be held from vertical displacement by embracing the sides of the bar between its top and bottom flanges. A portion of the coupling, as 32, is removable to admit of the coupling being detached when required, and the part 32 is secured firmly to the main portion of the coupling by bolts 33. The socket 24 will be connected by means of a knuckle-joint with the coupling 30, or, if desired, the coupling 30 may be attached directly to the side pieces of the arched frame, in which event the latter will have a limited movement relative to the sections, or, in other words, the sections can move independently, thereby admitting of the doubletree being dispensed with.

Chains 34 extend from the ends of the frame-bars 2 to the middle portion of the arched frame and serve to steady and strengthen the parts, especially when turning the implement at the ends of the rows. The seat 35 is mounted upon the pole intermediate of the members comprising the arched frame, so as to come about centrally above the implement. Foot-rests 36 are attached to the front members of the arched frame and extend inwardly, so as to be within convenient and easy reach of the driver's seat.

The levers 12 are easily accessible and are within convenient reach of the driver's seat and can be operated to change the pitch of the harrow-teeth without requiring the stopping of the team for this purpose. By having the draft-hooks 5 at opposite ends of the frame-bars 2 the singletrees and draft can be applied to either end of the sections, and by arranging the pole so as to be readily disconnected from its sockets the implement can be drawn in opposite directions without necessitating its reversal at the end of the field. The frame-bars may be straight throughout their length, or they may be arched over the roller 7, as shown in Fig. 10.

Having thus described the invention, what is claimed as new is—

1. An agricultural implement for the purposes set forth, comprising two sections provided with the earth-treating devices, an arched frame comprising approximately U-shaped side pieces oppositely inclined and connected at their upper ends, couplings loosely connecting the lower ends of the arched frame with the said sections and admitting of the latter having independent automatic horizontal and vertical tilting movements, and a pole connecting the members of the side pieces at their upper ends and extending over the space formed between them, substantially as specified.

2. In combination, two sections provided with earth-treating devices, an arched frame, a pole secured to the upper portion thereof, and couplings having an adjustable knuckle-joint connection with the sections and a pivotal connection with the ends of the arched frame, whereby the said sections can be moved farther apart or brought closer together and are adapted to automatically tilt vertically and to turn horizontally, substantially in the manner set forth for the purpose described.

3. In an agricultural implement, the combination of two sections having the earth-treating devices, an arched frame having pendent spindles at its ends and plates at the bases of the spindles formed with depending lugs, and sockets attached to the aforesaid sections and formed at their upper ends with plates having notches of greater length than the lugs to receive them and limit the relative turning of the two plates, substantially in the manner set forth for the purpose described.

4. In an agricultural implement, the combination of two sections bearing the earth-treating devices, an arched frame, a pole or tongue applied to the arched frame, and couplings between the extremities of the arched frame and the said sections, each coupling having its lower part formed with a series of eyes or sleeves each of which constitutes a complementary part of a knuckle-joint, and each adapted to act jointly with the complementary part of the knuckle-joint attached to the sections, whereby the latter can be separated or brought together and are adapted to automatically tilt vertically, substantially as set forth.

5. In an agricultural implement, the combination of two sections having earth-treating devices, an arched frame, and couplings between the arched frame and the said sections, and having a limited slidable connection with the said sections, whereby the latter have an independent reciprocating movement, substantially as and for the purpose set forth.

6. In combination, independent sections provided with earth-treating devices, an arched frame connecting the sections and comprising similar side pieces of approximately U form having their lower or converging ends loosely connected with the said sections and inclining outwardly and downwardly from their upper ends, and parallel cross-pieces connecting corresponding members of the said side pieces and having sockets intermediate of their ends in longitudinal alinement, and a pole fitted into the said sockets and secured therein, substantially as set forth.

7. In combination, independent sections provided with earth-treating devices, a frame comprising oppositely-inclining side pieces of substantially U form having loose connection at their lower ends with the said sections, and cross-bars connecting corresponding members of the side pieces at their upper ends and formed with sockets at a medial point which aline longitudinally, foot-rests provided on the front members of the side pieces, a pole secured in the longitudinally-alining sockets, and a seat secured to the pole between the upper ends of the members comprising the side pieces, substantially as specified.

8. In an agricultural implement, oppositely-disposed end bars of V form, parallel side bars connecting the outer extremities of the said end bars, a middle longitudinal bar having integral hooks at its ends and corresponding oblique flanges adjacent to the hooked extremities and secured to the inner terminals of the end bars, toothed bars journaled in bearings provided on the aforesaid side bars, a lever secured to one of the toothed bars and operatively connected with an arm extending from the other toothed bar, and means for securing the lever in an adjusted position, consisting of a hand-latch and a toothed segment, the latter being applied to the middle longitudinal bar, substantially as set forth.

9. In an agricultural implement, the combination of two sections having earth-treating devices, an arched frame, and couplings connecting the said sections with the arched frame and comprising a knuckle-joint, and having a part embracing the sides of a frame-bar and slidable on the latter between stops, substantially as specified.

In testimony that I claim the foregoing as my own I have hereto affixed my signature in the presence of two witnesses.

WILLIAM HENRY NEWTON.

Witnesses:
ROBERT T. WILLIAMS,
DAVID M. ADAMS.